United States Patent [19]

Chan et al.

[11] Patent Number: 5,550,547
[45] Date of Patent: Aug. 27, 1996

[54] MULTIPLE ITEM RADIO FREQUENCY TAG IDENTIFICATION PROTOCOL

[75] Inventors: Shun S. Chan, Flushing; Harley K. Heinrich, Brewster; Dilip D. Kandlur; Arvind Krishna, both of Briarcliff Manor, all of N.Y.

[73] Assignee: International Business Machines Corporation, Armonk, N.Y.

[21] Appl. No.: 304,340

[22] Filed: Sep. 12, 1994

[51] Int. Cl.$^6$ .................................................. G01S 13/79
[52] U.S. Cl. ........................... 342/42; 342/44; 342/51
[58] Field of Search ............................. 342/42, 44, 50, 342/51

[56] References Cited

U.S. PATENT DOCUMENTS

| | | | |
|---|---|---|---|
| 5,245,346 | 9/1993 | Nishimura et al. | 342/42 |
| 5,252,979 | 10/1993 | Nysen | 342/50 |
| 5,280,435 | 1/1994 | Weisshaupt et al. | 364/514 |
| 5,302,954 | 4/1994 | Brooks et al. | 342/44 |
| 5,347,263 | 9/1994 | Carroll et al. | 340/572 |
| 5,355,137 | 10/1994 | Schurmann | 342/42 |
| 5,365,551 | 11/1994 | Snodgrass et al. | 375/1 |
| 5,410,315 | 4/1995 | Huber | 342/42 |
| 5,434,572 | 7/1995 | Smith | 342/44 |
| 5,489,908 | 2/1996 | Orthmann et al. | 342/44 |

FOREIGN PATENT DOCUMENTS 585132  8/1993  European Pat. Off. .

OTHER PUBLICATIONS

Micron RFID Communications Protocol, Jul. 22, 1993, Micron Communications, Inc., pp. 1–71.
Supertag—RF Identification of Grouped Objects, New Product Opportunity, British Technology Group Ltd. Wireless Symposium at Santa Clara, pp. 407–411.

*Primary Examiner*—John B. Sotomayor
*Attorney, Agent, or Firm*—Louis J. Percello

[57] ABSTRACT

The present invention uses a novel adaptation of a tree splitting algorithm applied to Radio Frequency (RF) tagging technology to identify many tags in the RF field of a base station.

The invention uses the tree splitting algorithm to identify a single tag in a field of a plurality of radio frequency tags. Once the single tag is identified, the identified tag is placed in a Data_Exchange state where the base station can access data from the tag memory by using information that identifies the tag.

15 Claims, 6 Drawing Sheets

MULTIPLE ITEM RADIO FREQUENCY TAG IDENTIFICATION PROTOCOL

FIELD OF THE INVENTION

This invention relates to the field of radio frequency (RF) tag identification. More specifically, the invention relates to the field of identifying and reading information from more than one RF that transmitting at simultaneously.

BACKGROUND OF THE INVENTION

Radio Frequency Identification (RF ID) is just one of many identification technologies for identifying objects. The heart of the RF ID system lies in an information carrying tag. The tag functions in response to a coded RF signal received from a base station. Typically, the tag reflects the incident RF carrier back to the base station. Information is transferred as the reflected signal is modulated by the tag according to its programmed information protocol.

The tag consists of a semiconductor chip having RF circuits, logic, and memory. The tag also has an antenna, often a collection of discrete components, capacitors and diodes, for example, a battery in the case of active tags, a substrate for mounting the components, interconnections between components, and a means of physical enclosure. One variety of tag, passive tags, has no battery. They derive their energy from the RF signal used to interrogate the tag. In general, RF ID tags are manufactured by mounting the individual elements to a circuit card.

Basically, passive RF tags consist of two basic parts:

a) An analog circuit which detects and decodes the RF signal and also provides power to the digital part of the Tag using RF field strength from the Base Station, and b) A digital circuit which implements the multiple items of the tag identification protocol.

A radio frequency (RF) identification system also consists of an RF base station and a plurality of RF tags.

In a typical configuration, the base station has a computer section which issues commands to an RF transmitter and receives commands from the RF receiver. The commands serve to identify tags present in the RF field of the base station.

In some implementations, commands exist to gather information from the tags. In more advance systems, commands exist which output information to the tags. This output information may be held temporarily on the tag, it may remain until over written, or it may remain permanently on the tag.

The RF transmitter of the base station encodes the command from the computer section, modulates it from a base band to the radio frequency, amplifies it, and passes it to the RF antenna. The RF receiver gathers the return signal from the antenna, demodulates it from the RF frequency to the base band, decodes it, and passes it back to the computer section for processing. The base station antenna sends RF signals to and receives RF signals from one or more tags with in the RF signal range.

While the application of RF ID technology is not as widespread as other ID technologies, bar code for example, RF ID is on its way to becoming a pervasive technology in some areas, notably vehicle identification.

Multiple objects can be identified by checking each individually using bar code reader. However, this process consumes a lot of time. It is also error prone—the error rate made by either human beings or by the bar code reader is very high.

This iterative process can be simplified and solved by introducing the RFID Tag technology. The RFID tag can be used to identify multiple objects in a very short time, on the order of a second.

One way of implementing multiple RF tag identification is as follows:

a. the tag powers up in the RF field, starts a clock, and seeds a random number generator.

b. the tag sends out a 64-bit ID (at internal clock frequency) at intervals determined by the random number generator c. the base station synchronizes to the tag transmission from a transmitting tag in the field. If there is a successful reception (no errors), the station uses a power interrupting to transmit a simple shutdown code to the tag. This approach works because the station is synchronized to that tag and times its shutdown code using that tag frequency. The tag uses the gap detection circuitry to identify power interruptions.

d. Two shutdown modes are available: i) the tag is prevented from talking as long as it remains in the field; and ii) the tag is prevented from talking even after departing field (for approximately 10 minutes or more.) The shutdown mode (ii) is accessible only after shutdown mode (i) has been entered.

e. In this application, multiple items are identified by shutting down each tag immediately after a successful read. Other tags in the field, ideally, will not be synched to the internal frequency of the tag which has just been read, nor, ideally, will they have just finished transmitting their id when the base stations sends the shutdown signal to the tag which has just been identified.

This technology only applies identifying tags only, i.e., there is only a single read channel. The system can not write to the tags.

STATEMENT OF PROBLEMS WITH THE PRIOR ART

When multiple RF identification tags are simultaneously presented to a reader (base station), the tags conflict with each other. The simplest RF identification readers respond by either: 1. identifying the nearest tag in the field or 2. by not identifying any of the tags in the field. Another approach for identifying multiple tags in the field, as described above, has been to have the tags repeatedly identify themselves after random delay times between their transmissions, and then to disable the tag following successful reception by the reader.

This approach must be optimized for the expected number of tags in the field. If there are fewer than the expected number of tags in the field, this approach can potentially be very slow because the delay times between each tag read will be longer than necessary. If there more tags than the expected number of tags in the field, this approach will again be very slow, because there will be times when the base station will be faced with reading more than one tag. In these cases, the protocol will have to restarted. In extreme cases the base station may not be able to identify any of the tags in the field.

OBJECTS OF THE INVENTION

An object of this invention is an improved radio frequency tag identification system.

An object of this invention is a RF identification protocol for identifying an arbitrary number of tagged items in the field in a minimum amount of time.

Another object of this invention is an improved radio frequency tag identification system that can identify and gather information from more than one tag that is simultaneously transmitting an RF signal.

SUMMARY OF THE INVENTION

The present invention uses a novel adaptation of a tree splitting algorithm applied to Radio Frequency (RF) tagging technology to identify many tags in the RF field of a base station.

The invention uses the tree splitting algorithm to identify a single tag in a field of a plurality of tags. Once the single tag is identified, the identified tag is placed in a Data_Exchange state where the base station can access data from the tag memory by using information that identifies the tag.

DETAILED DESCRIPTION OF THE INVENTION

Figure 1:
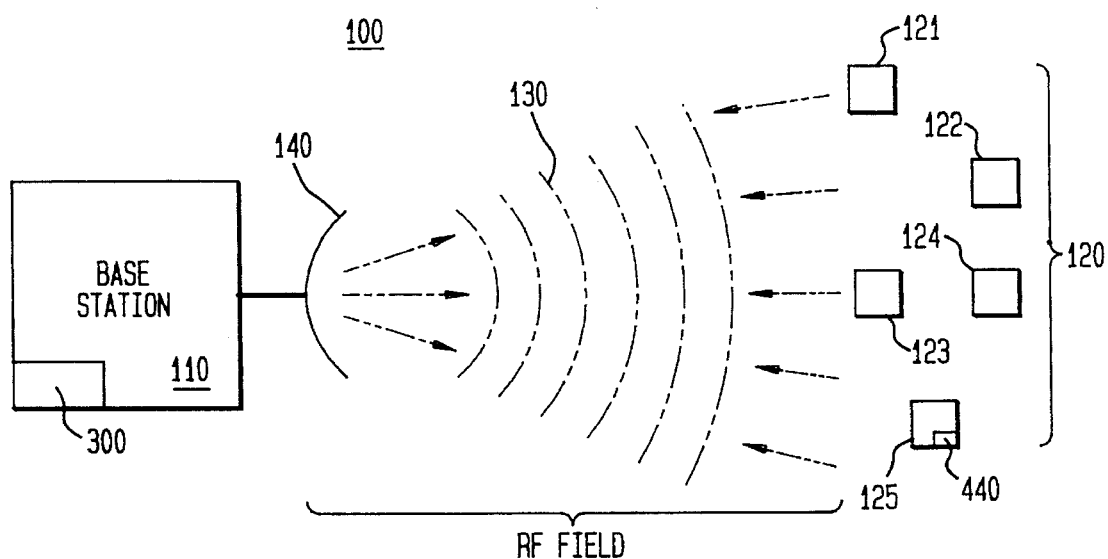
FIG. 1 is a block diagram of a novel radio frequency identification system.

FIG. 1 shows a block diagram of the Multiple Radio Frequence Identification system (100). Base station (110) will transmit a RF signal (130) through the antenna (140) to the RFID tags (120). The base station (110) runs a novel algorithm (300) that is used to enable the reading of a large number of RFID tags (120) that simultaneously are communicating with the base station (110). When each of the RFID tags (121–125) received a command, the tags will response by sending an RF signal back to the base station. The tags (121–125) each also runs a novel tag algorithm (440).

Figure 2:
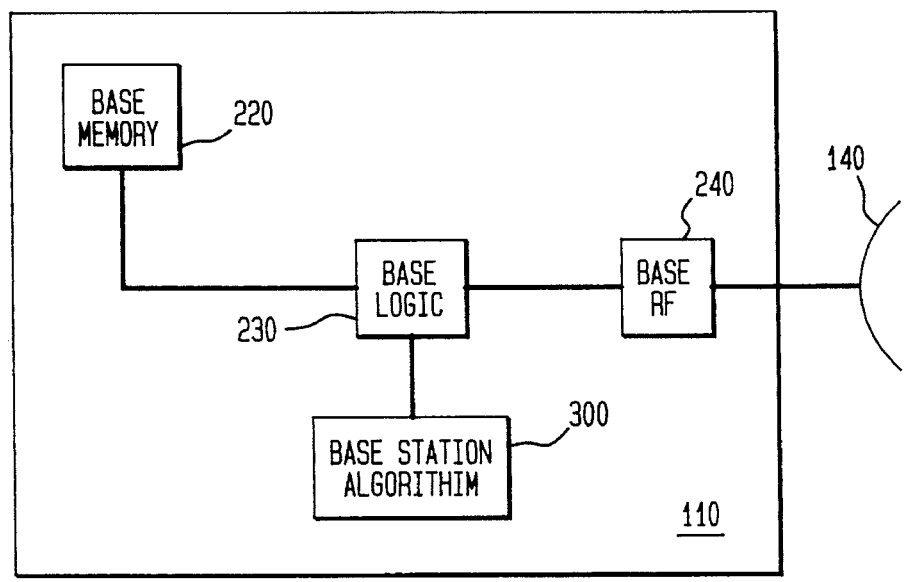
FIG. 2 is a block diagram of a novel base station used in the present invention.

FIG. 2 shows a block diagram of the base station (110). The base station design includes a Base Memory (220). The Base Memory is used to keep application data and identification information (tag number) of the RFID tags that could be in the field. The Base Memory (220) also stores a special command structure that is used to communicate with the RFID tags. In a preferred embodiment, a novel command structure for tag group selection are included also. These group select structures are described in the U.S. patent application Ser. No. 08/303,965 entitled "SYSTEM AND METHOD FOR RADIO FREQUENCY TAG GROUP SELECT" to C. Cesar et al. filed on Sep. 9, 1994 and is herein incorporated by reference in its entirety.

A Base Logic (230), contains a digital design that can control and execute the base station algorithm (300). The Base Logic (230) uses a Base RF (240) front end to send and receive the RF signal (130) through the attached antenna (140) of the Base Station (110).

The Multiple RFID Tag and Base Station (110) protocols are based on a tree splitting protocol with novel components—the set of special commands, their structures, and inputs of the tag states.

Figure 3:
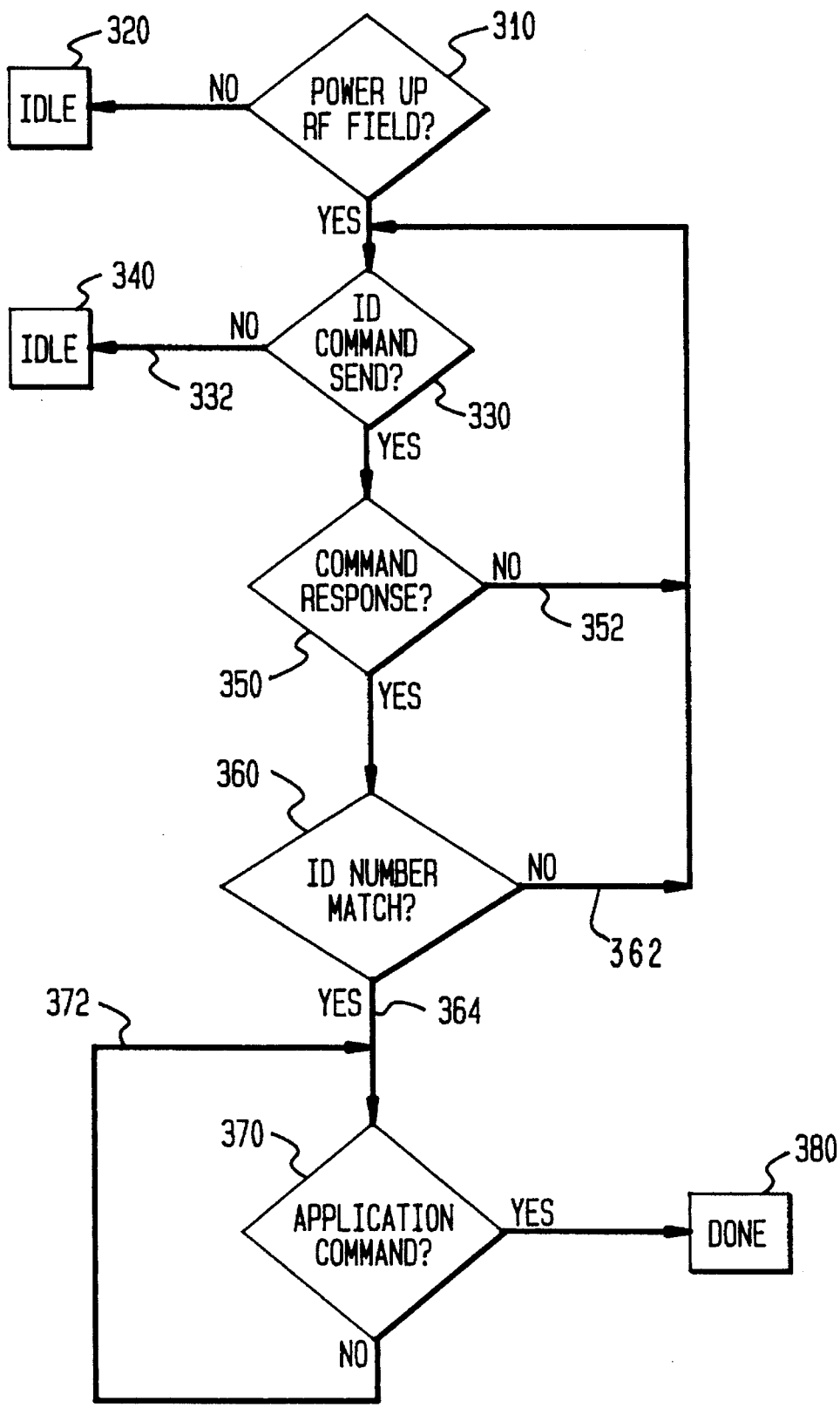
FIG. 3 is a flow chart of the algorithm executed by the base station.

FIG. 3 shows a flow chart of the base station algorithm (300). Once the base station is turned on (310), the Radio Frequency field (130) will have a certain power level. This power level will dictate the distance within which the base station (110) can communicate with tags (120). Those tags (120) able to communicate with the base station (110) are said to be in the field (130). This communication link will be die out (320) when the base station (110) is turned off.

With the RF signal (130) is active (312), a special set of identification commands can be issued (330) by the base station (110) to the RFID tags (120). If no identification command is issued (332) or sent (332) and the RF signal (130) is active (i.e., at its power level, 312), the base station will be in its idle (340) state.

When an identification command is issued (330) or sent (330), a response (350) signal will be sent back from RFID tags (120). If no response (352) signal comes back from RFID tags (120), the base station will either resend the identification command (330) or go to the idle (340) state.

If the RFID tags (120) respond to the identification command (350) that the base station (110) sent out (330), further checks are made. If the base station (110) identifies (360) the signal coming back from the tag (the response), base station application commands can be sent (370) to the identified tag (360). Zero or more application commands can be sent (372). When there are no more application commands, the algorithm ends (380).

A given tag (121) signal is identified if the tag (121) is the only tag responding to the base station (110) identification command (330).

Alternatively, there may be more than one tag (120) that tries to respond (350) to the base station (110) identification command sent (330). In this case, the tag identification (360) fails (362). Upon failure (362), the identification command is resent (330) via (362 and 352). This process is repeated until a single tag response (350).

In a preferred embodiment, application commands include read commands, that enable the base station (110) to read application data from the tag memory (460); write commands, that enables the base station (110) to write application data to the tag memory (460); and lock commands, that prevents further writing to certain tag memory (460) locations.

In a preferred embodiment, the identification commands include a Group_select command and a Group_unselect command. These commands are described in the U.S. patent application to C. Cesar et al. incorporated by reference above. Note that in the preferred embodiment both the Group_select and Group_unselect command can cause the following comparisons: equal, not equal, less than, and greater than. Further, two other identification commands are included in this preferred embodiment—fail command and resend command. The fail command is sent out by the base station if more than one tag transmits to the base station (110) at one time and cause the state counter (432) to increment (by one). (See 362 in FIG. 3.) The resend command causes the state counter (432) (in FIG. 4) to decrement (by one).

Figure 4:
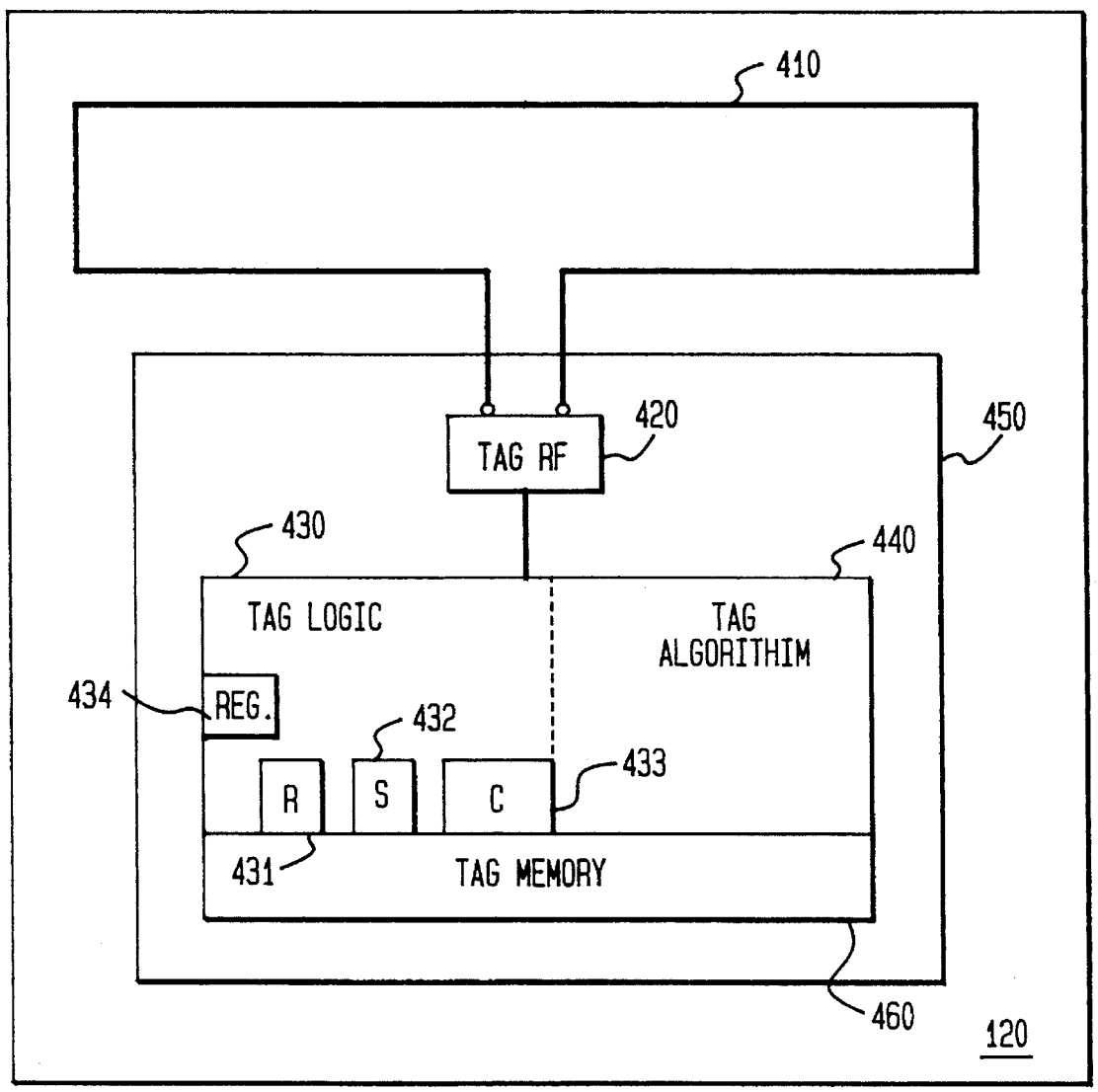
FIG. 4 is a block diagram of a novel RF tag structure used by the present invention.

FIG. 4 is a block diagram of a typical preferred embodiment of a RFID tag (120). Each RFID tag (120) contains a tag antenna (410), which is used to receive and transmit an RF signal. The tag antenna connects to the tag system (450) which includes a tag RF front end (420), tag logic (430), tag algorithm or tax state selector (440), and the tag memory (460). A tag RF (420) front end is used to convert the RF signal into DC voltage which powers up the tags logic (430) and the tag algorithm (440) and transmits information and commands to the tag. The tag logic (430) includes four main components: a) a Random number generator (431), b) an eight bit up-down state counter (432), c) a command decode logic (433), and d) a state register (434). A value in the state register (434) indicates what state the tag is in—Ready (510), Identify (530), and Data_Exchange (560). The random number generator is used to generate a true random number which is used to tell the RFID tag (120) to increment or decrement the up-down state counter (432) by one. The command decode logic (433) decodes a special command set which is sent from the base station (110). The tag algorithm (440) uses a novel tree splitting technique to identify all the tags in the field successfully even when more than one tag initially tries to simultaneously communicate with the base station.

Since each tag is assumed to have minimal intelligence, it does not recognize the existence of other tags in the field. The tags do not transmit except in response to queries from the base station (110). When queried by the base station (110), i.e., when the tags (120) are sent one or more identification commands, all the tags response simultaneously, thus interfering with each other's transmission. In this case the results received at the base station are a corrupted data set. (See the failed identification match 362 in FIG. 3.) The purpose of the algorithm to organize and sequence the transmission from the tags in an orderly manner so that the base station (110) can successfully receive the data.

Figure 5:
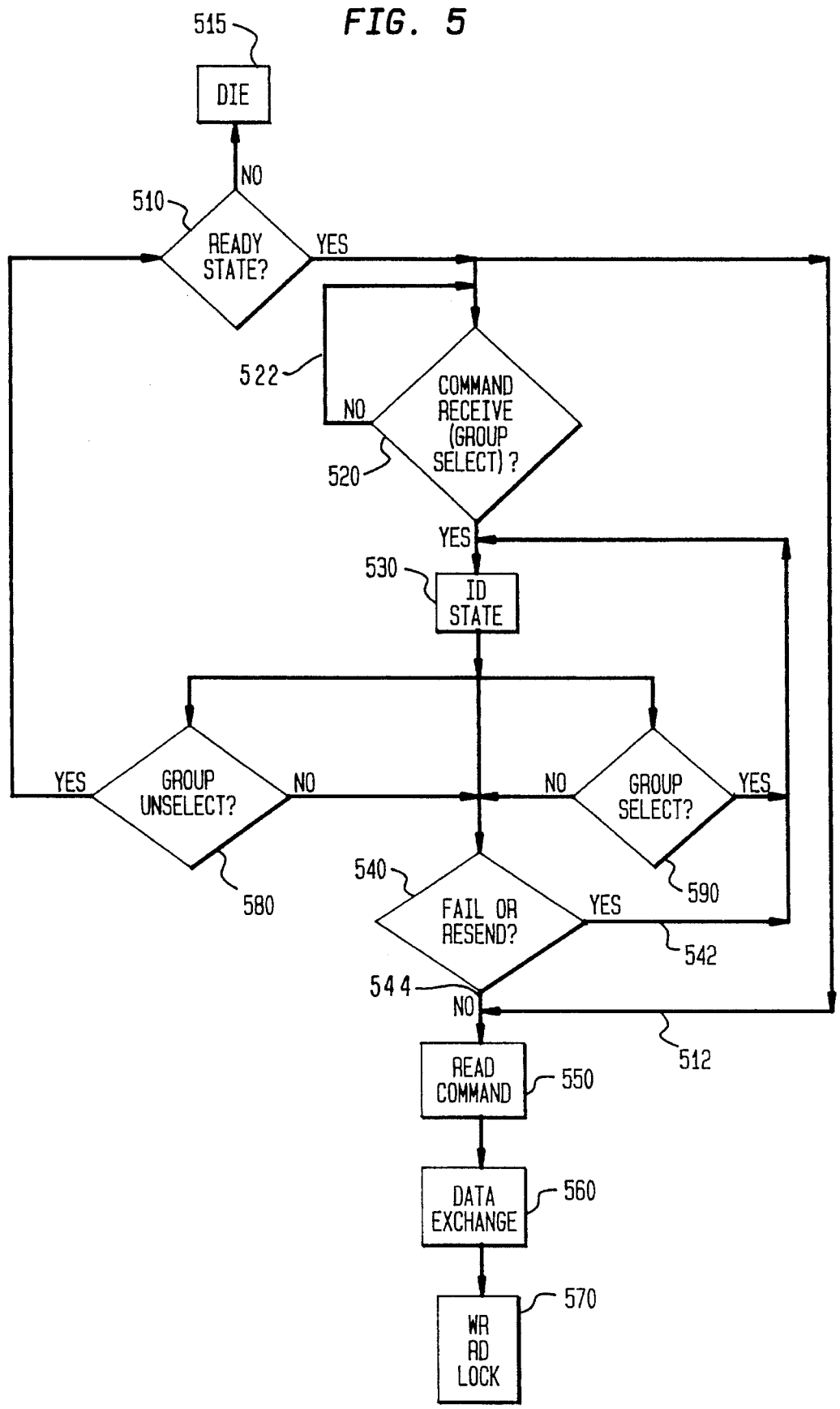
FIG. 5 is a flow chart of a preferred algorithm being executed by each of a plurality of RF tags.

Refer to FIG. 5. The tag algorithm (440) includes Three states—1) Ready state (510)), 2) Identification state (530), and 3) Data Exchange state (560). There are certain commands can only be recognized in a specific state.

Tag memory (460) is use to store all the application data and the tag identification number.

FIG. 5 is a flow chart of the RFID tag algorithm (440). In a preferred embodiment, when the RFID tag (120) is powered up by the RF signal (130) in the field, the RFID tag (120) itself is in the Ready state (510). (Note that in an alternative embodiment, an active tag—a tag with on-board battery power—can be used.) Since each tag is assumed to have minimal intelligence, it does not recognize the existence of other tags in the field. The tags do not transmit except in response to identification commands (330) (queries) from the base station (110). The RFID tag will die (515) out if the RFID tag is out of the RF signal (130) field. For example, when the base station (110) stops transmitting.

The Ready state (510) is the initial state of the tag (120). In a preferred embodiment, RFID tags (120) in the READY state (510) will listen to all transmissions and responses to the all identification commands and application commands. In a preferred embodiment, the identification command is the Group_select command and the application command is the Read command. After the base station (110) powers up, it waits a small amount of time (100–300 ms) for all the tags (120) in the field to stabilize in the READY state (110) before it sends out other commands. The RF carrier will be constantly sent out from the base station (110) even during this wait. This is done so that the RF section (420) of the tag maintain power to the tag (120).

All the logic circuitry in the tag (120) is powered up in the READY state (510), but the tag does not transmit anything until commanded by the base station.

The tag goes into the Identification (ID) state (530) only when a Group_select command is received (520) by a tag in the READY state (510). If no command is received (520), the tag will wait (522) until a Group_select command (520) is received. The ID state (530) is necessary since the base station may not know identification information of the tags (120) in the field.

If a Read command is received by a tag in the READY state (510), the tag will go (512) to the Data_exchange state (570). In this case the tag will send an acknowledgement to the base station. In a preferred embodiment, this acknowledgement is 8 bits of data. This is possible if the base station already has the identification of the tags in the field.

In the ID state (530) the tag will continue to transmit identification information (like its tag number) back to the base station (110) as long as the state counter of the tag is a predetermined value. In a preferred embodiment, and throughout this discussion, this value is zero.

If more then one tag is transmitting information to the base station (110), the base station issues a Fail command (540).

When the tags in the field receive a Fail command (540), each tag increments their state counter (432) by one if either:

1. the state counter (432) has a value greater than zero or
2. the state counter (432) has a value equal to zero and a value of the tag random number (431) is a given value. In a preferred embodiment this value zero.

Note that tags with state counter (432) values that are not zero, stop transmitting. Therefore, these tags will not transmit at all until there counters can be decremented to zero because in all future fail command transmissions of the base station (110) will cause their state counter to increment (by condition 1 above). Note also that these tags are still in the ID state (530) even though they are not transmitting.

However, those tags (120) in the field that are in the ID state (530) that have state counter (432) with a zero value, will continue to transmit. After this transmission, these tags will redetermine, e.g. "roll", their random number value (431). If there are more than one of these tags (120) transmitting, the base station (110) will again send out a Fail command (540). At this point, the conditions for incrementing the tag state counters (432) are reapplied.

The process in repeated (542) until, only one tag remains with a zero value in its state counter (432). When this occurs, there is a non fail condition (544) and the base station will receive the identification information (tag number) of the tag. Then the base station will issue an application command (550), (in the preferred embodiment this is a Read command), to access (read) the appropriate data in the memory (460) of the sole tag that is transmitting. In a preferred embodiment, this is eight bytes of data at the tag memory location (460) specified in the Read command (550).

After the data of the sole tag is read (550), the tag logic (430) causes the tag to go to the Data_exchange state (560). That is the tag, leaves the ID state (530), and stops transmitting its identification information. In the Data_Exchange state, the base station, knows the identity of the tag, e.g., the base station (110) can issue (570) any application command directly to the identified tag. In a preferred embodiment, these application commands are the Read command, Write command, and Lock command.

In an alternative embodiment, a Group_unselect (580) command can be issued by the base station to remove some of the tags from the ID state (530). In this case, the tags that are unselected go back to the READY state (510).

All tags in the Data_exchange state have already been successfully identified by the base station. Tags in this state only response to certain commands. Data can be read, write or Lock (570) to a specific tag base on the command that sends from base station. Tag remains in Data Exchange state until tag leaves the RF field for a predetermined amount of time. In this case, the tag goes into Ready state and can only be activated again by a RF signal which power up by the base station.

After the READ command (550), subsequent to a non fail condition (544), is issued, the base station (110) issues a Resend command (540). The Resend command causes all tags to decrement their counters by one. Therefore, tags in the ID state (530) with counters that had a one value, will have a zero value and will begin to transmit their identification information back to the base station (110). If there is more than one tag responding the identification process using Fail commands as described above is repeated. If there are no tags responding after the Resend command is issued (540), one or more Resend commands are sent to the tags in the field in an effort to reduce some tag state counters to zero.

If after one or more Resend commands is issued and there is still no response from any tag in the field, a Group_select command (590) is send in order to reset all of the tag (120) state counters (432) to zero (the initial state). This Group_select (590) may bring more tags into the ID state (530) from the READY state (510) particularly if these tags are new in the field. Those tags in the Data_exchange state (560) are unaffected by the Group_select (590) command.

In a preferred embodiment, tag state counters (432) only increment when the base station (110) sends a Fail command. Likewise, the tag state counters (432) only decrement when the base station (110) sends a Resend command. By counting the number of sent Fail commands and Resend commands, the base station (110) can determine that all the tags in the field have been identified when the number of Fail commands and Resend commands are equal.

Figure 6:
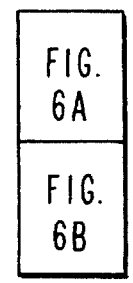
FIG. 6 is a drawing showing one example of how the features of the present invention cooperate to enable identification and information access to more that one RF tag simultaneously transmitting to the base station.
Figure 6A:
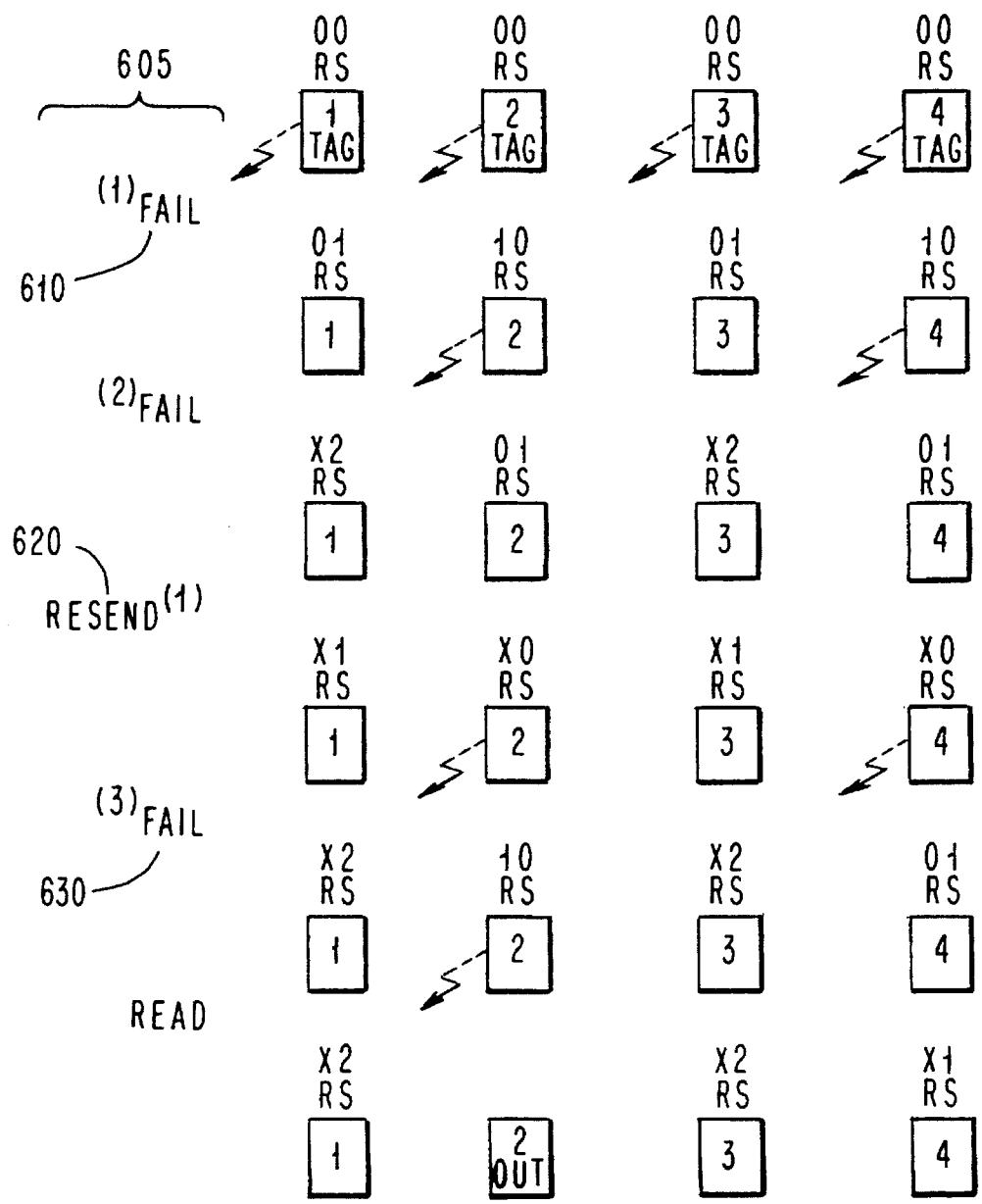
Figure 6B:
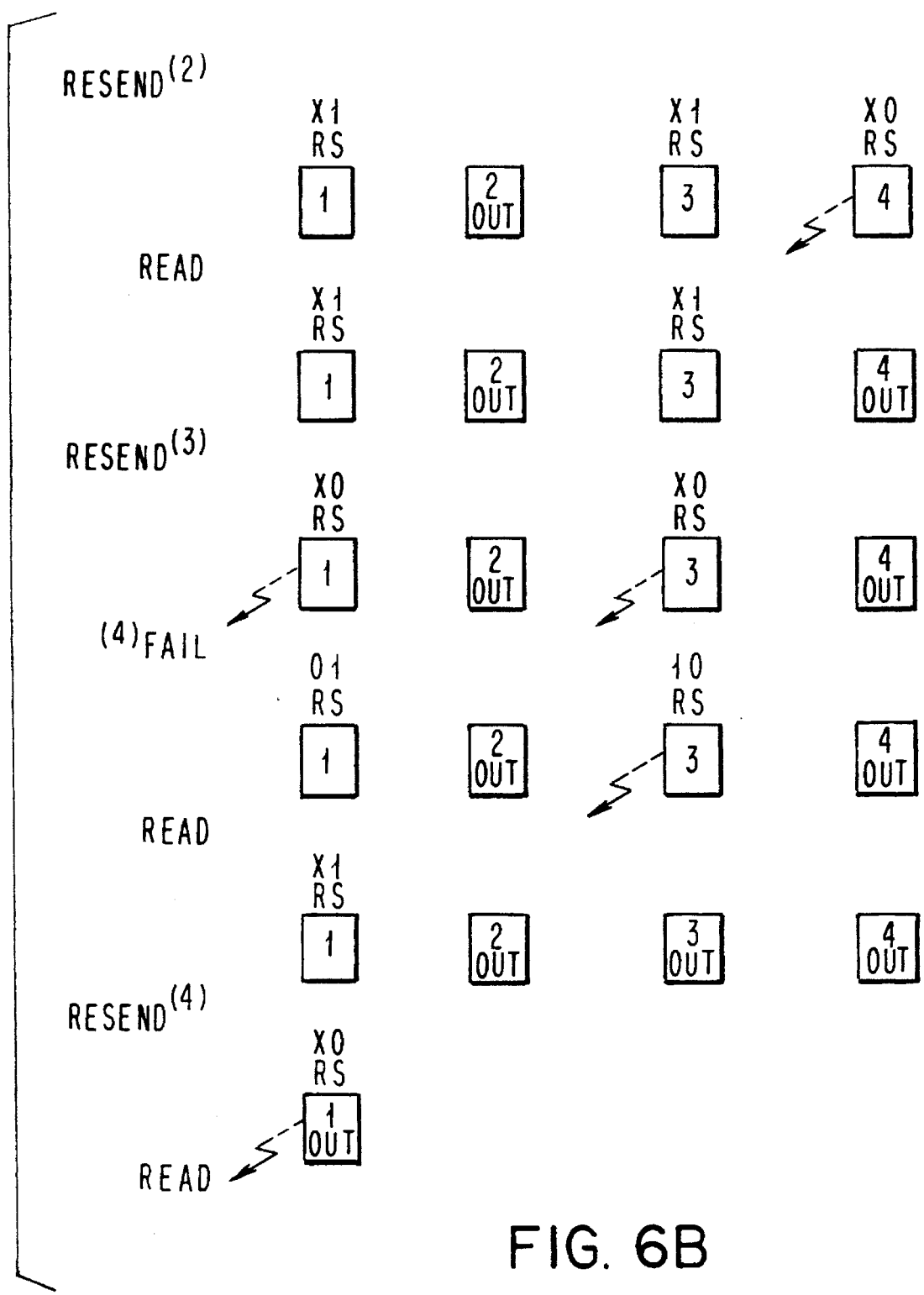

FIG. 6 shows an example of the Multiple Item RF Identification protocol. This algorithm uses two pieces of hardware on the tag, an 8 bit state counter (432, S) random number (one bit—1 or 0) generator (431, R), and a command decode logic (433, 605).

In the beginning, a group of tags (1 to 4) are moved to the ID state and their state counters (S) are set to 0. Subsets of the group were unselected back to the READY state. Other subgroups were selected before the identification process begins. Only the finally selected tags are shown in FIG. 6.

After selection, the following method (see FIGS. 3 and 5) is performed:

1—Tags (1 to 4) in the ID state with the counter (432) at 0 transmit their ID. Initially all the selected tags have a zero value in their state counter (S, 432).

2—Since more than one tag transmits, the base station (110) receives an error. The FAIL (610, 540) command is sent. FAIL (610) causes all tags with a count not equal to 0 to increment their counter (432). That is, they move further away from being able to transmit.

FAIL (610) also causes all tags with a count of 0 (those who just transmitted) to generate a random number (431). Those who roll a zero, increment their counter, and do not transmit. Those who roll a 1 keep the counter at zero and try again.

In this case, tag 2 and tag 4 will re-transmitted. But tag 1 and tag 3 will not transmit.

3—A second tag transmission is done. Since tag 2 and tag 4 transmitted together, a collision signal will be received by the base station (110). Therefore a FAIL (610) command will be issued from the base station (110) to the tags once again.

4—The count of the tag 1 and tag 3 will be incremented by 1 to became 2 due to the FAIL (610) command received. And the count of tag 2 and tag 4 (with a zero in the state counter) will also incremented by 1 to became 1 due to the random number roll to zero and the FAIL command (610) received.

5—Now there will be no RF signal transmitting back to the base station due to the non zero state counter value at the tags 1-4. Therefore when the time out situation is met, A RESEND (620, 540) command will be sent to the tags. This causes all the tags state counters to decrement by 1.

6—Now the state counter (432) value of the tag 2 and tag 4 are zero and they re-transmit again. But tag 1 and tag 3, due to their state counter value being non zero, do not transmit.

7—Since tag 2 and tag 4 transmitted together, a collision signal will be received by the base station (110). Therefore a third FAIL (610) command will be issued from the base station (110) to the tags.

8—The counter (432) value of tag 1 and tag 3 will be incremented by 1 to became the value 2. But since tag 2 has a random number (431) roll (R) to 1 and a previous state counter (432) value of zero and it re-transmits. For the tag 4, its state counter (432) value had been incremented by 1 due to the random number (431) roll to zero and will not transmit.

9—A success transmission (non fail—544) occurred since a single tag 2 ID is received by the base station (110). A READ (630, 550) command with the ID of tag 2 is sent by the base station (110). If the READ (550, 630) command is received correctly, that tag moves to the DATA_EXCHANGE state (560) and transmits its data (8 bytes).

10—A second RESEND (620, 540) command will be send right after the READ (630, 550) command is sent. Tag 1, 3, and 4 will decrement their state counter (432) by 1 after they receive the RESEND (620, 540)) command. Tag 1 and 3 will have a state counter (C) value of 1 and tag 4 will have state counter (C) value of zero. Only tag 4 transmit.

11—A success transmission (non fail 544) occurs since a single tag 4 ID is received by the base station (110). A second READ (630, 550) command with the tag 4 ID is sent by the base station (110). If the READ command is received correctly, tag 4 moves to the DATA_EXCHANGE state and transmits its data (8 bytes).

12—A third RESEND (620, 540) command will be send again right after the READ (630) command is sent. Tag 1, and 3 will decrement their counter by 1 after they receive the RESEND (620) command. Tag 1 and 3 will have state counter value of zero. So both of the tags will transmitted.

13—Due to the collision signal detected by the base station (110). A forth FAIL (610) command will be issued to the tag 1 and 3. A counter value of the tag 1 will be incremented to 1 due to its random number roll (R) to zero. Tag 3 will have the same state counter value zero due to the random number roll (R) to 1. Therefore, only tag 3 will transmit.

14—A success transmission occurs since a single tag 3 ID is received by the base station. A third READ (630) command with the ID is sent by the base station. If the READ command is received correctly, tag 3 moves to the DATA_EXCHANGE state and transmits its data.

15—A forth RESEND (620, 540) command will be send right after the READ (630) command is sent. Tag 1 will decrement its state counter (S) by 1 to became zero after receiving the RESEND (620, 540) command. Tag 1 will transmit.

16—Again a success transmission occurs since a single tag 1 ID is received by the base station. A forth READ (630) command with the tag 1 ID is sent by the base station. If the READ command is received correctly, tag 1 moves to the DATA_EXCHANGE state and transmits its data.

17—Finally, all tags (1 to 4) in the field are identified and ready to do any applications that the base station wants it to perform. This can be confirmed because the number of Resend and Fail commands sent by the base station are equal (to 4).

Given this disclosure, one skilled in the art can develop alternative equivalent embodiments that are within the contemplation of the inventors.

We claim:

1. a radio frequency tag for communicating with a base station, comprising:
   a. an antenna and tag radio frequency circuit for sending and receiving radio frequency signals to and from the base station;
   b. a tag memory for storing tag data;
   c. a tag logic circuit connected to the tag radio frequency circuit and the tag memory, the tag logic circuit having a tag state register that indicates the tag is in a state that is one of the states including an ID and Data Exchange, the tag logic further having a state counter and a random number generator; and
   d. a tag state selector run by the tag logic placing the tag in the ID state by setting the state register to ID when the base station sends the tag an identification command and the tag state selector upon receiving a Fail command from the base station causing a state counter value to increase in the state counter if:
   a. the state counter has a value not equal to a predetermined value, or
   b. the state counter has a value equal to the predetermined value and the random number generator has a given value,
   the tag not transmitting the tag identification information while the state counter value is not equal to the predetermined value and the tag state selector further causing the random number generator to generate a new random value.

2. A tag, as in claim 1, where the tag further has a READY state and the state register being set to READY when the tag is powered, the tag state selector placing the tag in the ID state by setting the state register to ID when the base station sends the tag the identification command, the identification command causing the tag to transmit a command response back to the base station while the tag is in the ID state.

3. A tag, as in claim 2, where the command response is tag identification information.

4. A tag, as in claim 3, where the identification command is a Group_select command.

5. A tag, as in claim 4, where the tag receives a Resend command from the base station that causes the tag state selector to decrease the state counter value.

6. A tag, as in claim 5, where the tag starts sending the tag identification information when the state counter value is equal to the predetermined value.

7. A tag, as in claim 6, where the base station sends the tag a READ command and the tag state selector placing the tag in the Data_Exchange state whereby the base station can sent one or more application commands to the tag by identifying the tag with the identification information sent to the base station.

8. A tag, as in claim 5, where the Fail command causes the tag state selector to decrease the state counter value and the Resend command causes the tag state selector to increase the state counter value.

9. A tag, as in claim 5, the predetermined value is zero and the given value is zero.

10. A tag, as in claim 5, the tag state selector increasing the state counter by one for each Fail command sent and decrementing the state counter by one for each Resend command sent whereby the base station has read the identification information from every tag in a field of tags when the number of Fail and Resend commands are equal.

11. A tag, as in claim 5, the tag state selector resetting the value in the state counter to the predetermined value when the tag receives a Group_select command from the base station.

12. A tag, as in claim 1, the tag state selector placing the tag in the READY state by resetting the state register to READY when the tag receives a Group_unselect command from the base station.

13. A tag, as in claim 1, the tag state selector placing the tag in the Data_Exchange state by setting the state register to Data_Exchange when the tag receives a READ command from the base station whereby the tag sends back an acknowledgement.

14. A system for reading information from a plurality of radio frequency tags that are in the field of a radio frequency signal sent by a base station, comprising:
   i. a tag, further comprising:
   a. an antenna and tag radio frequency circuit for sending and receiving radio frequency signals to and from the base station;
   b. a tag memory for storing tag data;
   c. a tag logic circuit connected to the tag radio frequency circuit and the tag memory, the tag logic circuit having a tag state register that indicates the tag is in a state that is one of the states including READY, ID, and Data Exchange, the tag logic further having a state counter and a random number generator; and
   d. a tag algorithm, run by the tag logic;
   ii. a base station that is able to transmit information commands to the field of tags, the information commands including a Group_select, a Group_unselect, a Fail, and a Resend command,
   a. the Group_select command causing the tag algorithm to place one or more selected tags in the ID state by causing each selected tag algorithm to set its respective state register to ID and reset its respective state counter to a predetermined value,
   b. the Group_unselect command causing the tag algorithm to place one or more unselected tags in the ID state to the READY state;
   c. the Fail command being generated by the base station when more than one tag sends tag identification information to the base station simultaneously, the Fail command causing the algorithm of each selected tag to increment its respective state counter if:
   1) the state counter has a value not equal to a predetermined value, or 2) the state counter has a value equal to the predetermined value and the random number generator has a given value, d. the Resend command sent by the base station when tag identification information is sent back to the base station in response to a READ command by a single tag in the field, the Resend command causing the state counter of all the tags in the field to decrement, whereby the base station can identify an individual tag in the field of tags, and cause the identified tag to go into a Data_Exchange state where the base station can access information from the tag memory.

15. A method, for reading a radio frequency identification tag in a radio frequency field of a plurality of tags comprising the steps of:

a. sending a group_select command from a base station that places one or more selected tags in the field in a ID state;

b. sending identification information from all the selected tags to the base station;

c. sending a fail command from the base station if more than one tag sends identification information simultaneously;

d. increasing a state counter value in the state counter of one or more selected tags if:

1) the state counter has a value not equal to a predetermined value, or 2) the state counter has a value equal to the predetermined value and the random number generator has a given value, the tag stopping transmission of the tag identification information while the state counter value is not equal to the predetermined value and the tag algorithm causing the random number generator to generate a new random value;

e. sending identification information a next time from all the selected tags to the base station, the selected tags having a state counter value equal to the predetermined value;

f. repeating steps c–e until a sole tag is sending identification information to the base station;

g. issuing a READ command to the sole tag using the identification information of the sole tag; and h. placing the sole tag in a Data_exchange state where the base station can access data from the sole tag memory by using application commands.

* * * * *